(12) United States Patent
Dickens et al.

(10) Patent No.: US 7,373,448 B2
(45) Date of Patent: May 13, 2008

(54) METHOD, SYSTEM, AND PROGRAM FOR BUILDING A QUEUE TO TEST A DEVICE

(75) Inventors: Louie Arthur Dickens, Tucson, AZ (US); Craig Anthony Klein, Tucson, AZ (US); Jonathan Wade Ain, Tucson, AZ (US); Robert George Emberty, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 10/812,326

(22) Filed: Mar. 29, 2004

(65) Prior Publication Data

US 2005/0216644 A1 Sep. 29, 2005

(51) Int. Cl.
*G06F 12/00* (2006.01)

(52) U.S. Cl. .................. 710/309; 710/244; 710/260

(58) Field of Classification Search .................. 710/36, 710/44, 244, 260; 709/246; 703/25
See application file for complete search history.

(56) References Cited

U.S. PATENT DOCUMENTS

| | | | |
|---|---|---|---|
| 4,907,230 A | 3/1990 | Heller et al. | |
| 5,033,049 A | 7/1991 | Keener et al. | |
| 5,257,393 A | 10/1993 | Miller | |
| 5,333,277 A | 7/1994 | Searls | |
| 5,471,634 A | 11/1995 | Giorgio et al. | |
| 5,475,814 A | 12/1995 | Tomimitsu | |
| 5,499,378 A | 3/1996 | McNeill, Jr. et al. | |
| 5,546,550 A | 8/1996 | Carter | |
| 5,615,335 A | 3/1997 | Onffroy et al. | |
| 5,752,083 A | 5/1998 | Krakirian | |
| 5,754,887 A * | 5/1998 | Damron et al. | 710/39 |
| 5,796,938 A | 8/1998 | Emberty et al. | |
| 5,918,057 A * | 6/1999 | Chou et al. | 710/260 |
| 6,009,275 A * | 12/1999 | DeKoning et al. | 710/220 |
| 6,170,042 B1 | 1/2001 | Gaertner et al. | |
| 6,223,244 B1 * | 4/2001 | Downer et al. | 710/244 |
| 6,295,573 B1 * | 9/2001 | Bailey et al. | 710/260 |
| 6,336,150 B1 | 1/2002 | Ellis et al. | |
| 6,336,157 B1 * | 1/2002 | Carbonaro et al. | 710/59 |
| 6,629,166 B1 * | 9/2003 | Grun | 710/36 |
| 6,938,133 B2 * | 8/2005 | Johnson et al. | 711/158 |
| 7,127,572 B2 * | 10/2006 | Tyndall et al. | 711/156 |
| 2003/0014568 A1* | 1/2003 | Kishi et al. | 710/4 |
| 2004/0230764 A1* | 11/2004 | Merchant et al. | 711/173 |
| 2005/0283541 A1* | 12/2005 | Ain et al. | 710/5 |

OTHER PUBLICATIONS

IBM Corp., "Multi-Thread Sequencing in a Small Computer System Interface Environment", Technical Disclosure Bulletin, vol. 37, No. 09, Sep. 1994, pp. 497-500.

R.J. Berg, et al., "Explore SCSI-2 Command Queues with Debugger", Electronic Design, vol. 37 No. 4, Feb. 23, 1989, pp. 79-82 (Abstract).

* cited by examiner

*Primary Examiner*—Alford Kindred
*Assistant Examiner*—Ernest Unelus
(74) *Attorney, Agent, or Firm*—David W. Victor; Konrad Raynes & Victor LLP

(57) ABSTRACT

Provided are a method, system, and device for signaling a reconnection inhibitor over a bus to cause the reconnection inhibitor to access the bus to inhibit an Input/Output (I/O) controller from accessing the bus. An initiator transmits I/O requests on the bus to the I/O controller, wherein the I/O requests are queued in an I/O queue, wherein the I/O controller is inhibited by the reconnection inhibitor from draining the queue while the initiator transmits requests to the I/O controller.

23 Claims, 6 Drawing Sheets

METHOD, SYSTEM, AND PROGRAM FOR BUILDING A QUEUE TO TEST A DEVICE

BACKGROUND OF THE INVENTION

1. Field of the Invention

The present invention relates to a method, system, and program for building a queue to test a device.

2. Description of the Related Art

A storage controller manages Input/Output (I/O) requests from connected hosts and initiators to or one or more interconnected disk drives which may be configured as a Redundant Array of Independent Disks (RAID), Just a Bunch of Disks (JBOD), Direct Access Storage Device (DASD), etc. During the development or manufacture of such storage controllers, there may be a need to build a test queue of I/O requests to simulate and test how the storage controller manages I/O requests in a real time environment where the storage controller receives numerous operations from connected devices.

FIG. 1 illustrates a testing system 2. A test initiator 4 sends I/O requests to a storage controller 6 directed to a storage device 8, such as one or more interconnected disk drives, over a SCSI bus 10 to test the I/O performance at the storage controller 6. In order to build an I/O queue at the storage controller 6, the test initiator 4 signals a diagnostic device 12 over a test control signal line 14, which is a separate communication channel from the SCSI bus 10, to prevent the storage controller 6 from arbitrating on the SCSI bus 10 to complete queued I/Os. The storage controller 6 is assigned a lower SCSI device address than the diagnostic device 12, such as less than or equal to address five, and the diagnostic device 12 is assigned SCSI address six and the test initiator 4 is assigned the highest SCSI device address, address seven.

In response to detecting the test control signal active on the test control signal line 14 and detecting a SCSI address arbitrating on the SCSI bus 10 that is less than that of the diagnostic device 12, such as less than or equal to five, the diagnostic device 12 asserts its address bit on the bus 10 to block the storage controller 6 from arbitrating on the bus 10. The diagnostic device 12 would deassert its address bit from the bus 10 after a second or so. The storage controller 6 I/O queue would build-up because the diagnostic device 12 prevents the storage controller 6 from processing the I/O queue by blocking the storage controller 6 from accessing the SCSI bus 10 to complete queued I/O requests. The diagnostic device 12 has priority over the storage controller 6 on the SCSI bus 10 because the diagnostic device 12 has a higher SCSI address than the storage controller 6.

After the I/O queue reaches a sufficient level, the test initiator 4 may then cease the test control signal active on the test control signal line 14 to cause the diagnostic device 12 to deassert its address on the SCSI bus 10 in order to allow the storage controller 6 to access the SCSI bus 10 to complete processing queued I/O requests. The test initiator 4 can then monitor the storage controller 6 performance when processing the I/O queue.

SUMMARY OF THE INVENTION

Provided are a method, system, and device for signaling a reconnection inhibitor over a bus to cause the reconnection inhibitor to access the bus to inhibit an Input/Output (I/O) controller from accessing the bus. An initiator transmits I/O requests on the bus to the I/O controller, wherein the I/O requests are queued in an I/O queue, wherein the I/O controller is inhibited by the reconnection inhibitor from draining the queue while the initiator transmits requests to the I/O controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
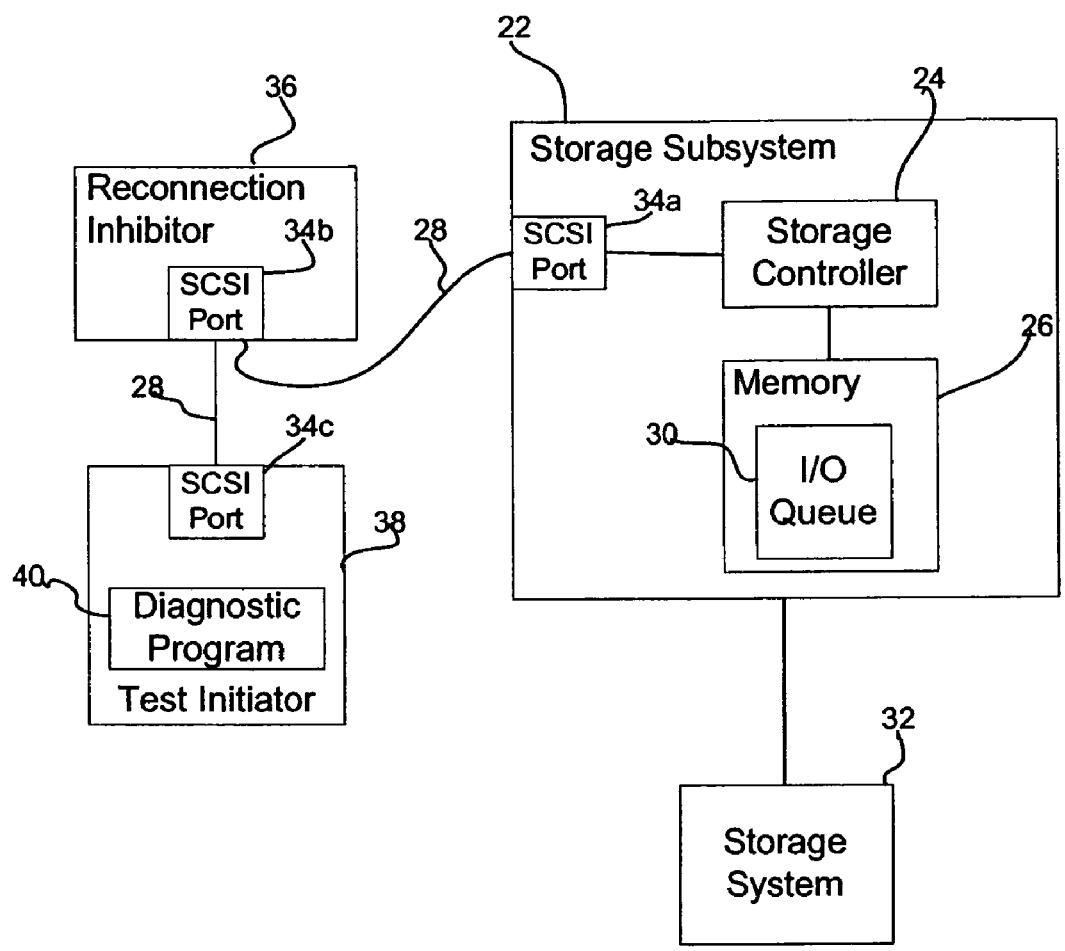
FIG. 2 illustrates computing environment in which embodiments are implemented.

FIG. 2 illustrates a diagnostic computing environment in which embodiments of the invention are implemented. A storage subsystem 22 includes a storage controller 24, memory 26, a bus 28, shown as a Small Computer System Interface (SCSI) bus, and an I/O queue 30 in which I/O requests directed to a storage system 32 are queued. Each device connected to the SCSI bus 28 has a SCSI port 34a, 34b, 34c, comprising a hardware interface to enable the devices to communicate on the bus 28. Each port 34a, 34b, 34c handles the bus arbitration operations for the device and, in SCSI embodiments, a device asserting a higher device identifier, e.g., a SCSI ID, when attempting to access the bus would be given access to the bus over a device concurrently attempting to access the bus with a lower device bus address. A port 34a, 34b, 34c undergoing arbitration routine to access the bus 28 when the bus 28 is free would check if a device using a higher priority ID, i.e., a higher SCSI ID, has asserted its higher priority ID on the bus. If so, then the device having the lower ID will retry later until there is no higher priority device asserting priority on the bus. If the bus 28 is open and no device has raised a higher device ID, then the device has won arbitration and asserts control over the bus. In this way, if multiple devices attempt to access the bus 28, the device having the highest priority, which in the case of parallel SCSI is the device having the highest device ID, will gain control of the bus 28. In alternative embodiments, a device a lower device ID may have a higher priority than a higher device IDS. Further details of the SCSI protocol are described in the publication "SCSI Architecture Model-3 (SAM-3)", working draft, Rev. 11 (Jan. 23, 2004), which publication is incorporated herein by reference in its entirety.

Figure 1:
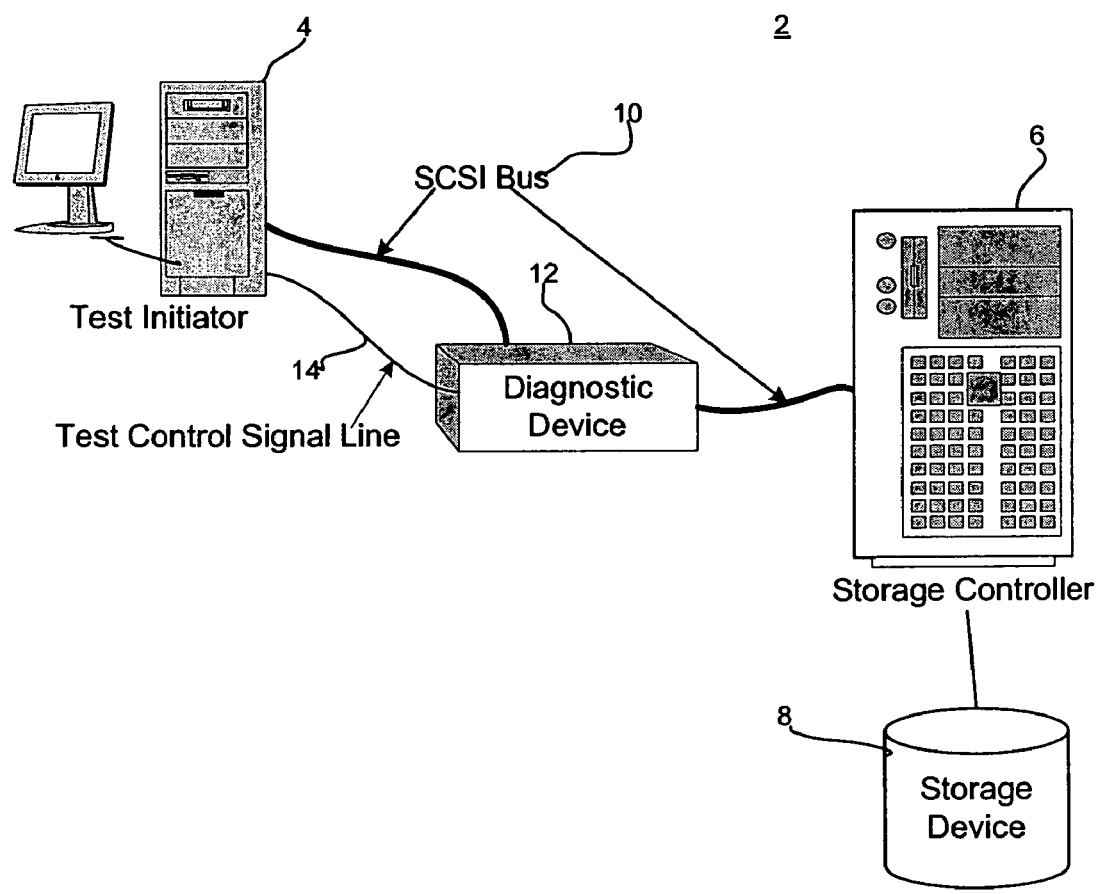
FIG. 1 illustrates a diagnostic testing system.

In certain SCSI embodiments, such as parallel SCSI and as shown in FIG. 1, the test initiator 38 may be connected to the reconnection inhibitor 36 which is directly connected to the bus 28 in a daisy chain configuration, where the test initiator 38 communicates with the bus 28 via the reconnection inhibitor 36. The test initiator 38 includes a diagnostic program 40 that generates I/O requests, such as read and write requests, to submit to the storage controller 24 to execute against the storage system 12.

In described embodiments, the test initiator 38 may generate and transmit I/O requests to the I/O queue 30 to fill the I/O queue 30 with requests to test the storage controller 24. To allow this to occur, the reconnection inhibitor 36 accesses the bus 28 with a device priority higher than the device identifier of the storage controller 24 to inhibit the storage controller 24 from accessing the bus 28 to complete I/O requests and further drain the I/O queue 30. Further, the reconnection inhibitor 36 may have a lower priority than the test initiator 38, i.e., a lower device identifier, so as not to inhibit the test initiator 38 from accessing the bus 28 and filling the I/O queue. To provide the test initiator 38 with the highest priority and the reconnection inhibitor 36 with the next highest priority, the test initiator 38 is assigned a device identifier, e.g. SCSI device ID, higher than that assigned to the reconnection inhibitor 36 and the reconnection inhibitor 36 is assigned a higher device ID than that assigned to the storage controller 24. The device ports 34a, 34b, 34c will perform asynchronous arbitration to ensure that a device having the highest priority, i.e., the highest device ID, takes precedence in accessing the bus 28 when free over devices with a lower bus priority, e.g., lower device ID. When the storage controller 24 processes an I/O request from the I/O queue 30, the reconnection inhibitor 36 prevents the storage controller 24 from accessing the bus to return status or data to complete the request by preventing the storage controller 24 from accessing the SCSI bus 28 to complete requests in the queue between I/O requests submitted by the test initiator 38.

In described SCSI embodiments, requests from a device having a higher bus device ID have priority over devices attempting to access the bus having a relatively lower device ID. In alternative embodiments, different types of addressing and identification schemes may be used to indicate that a device accessing the bus has priority over other devices.

Figure 3:
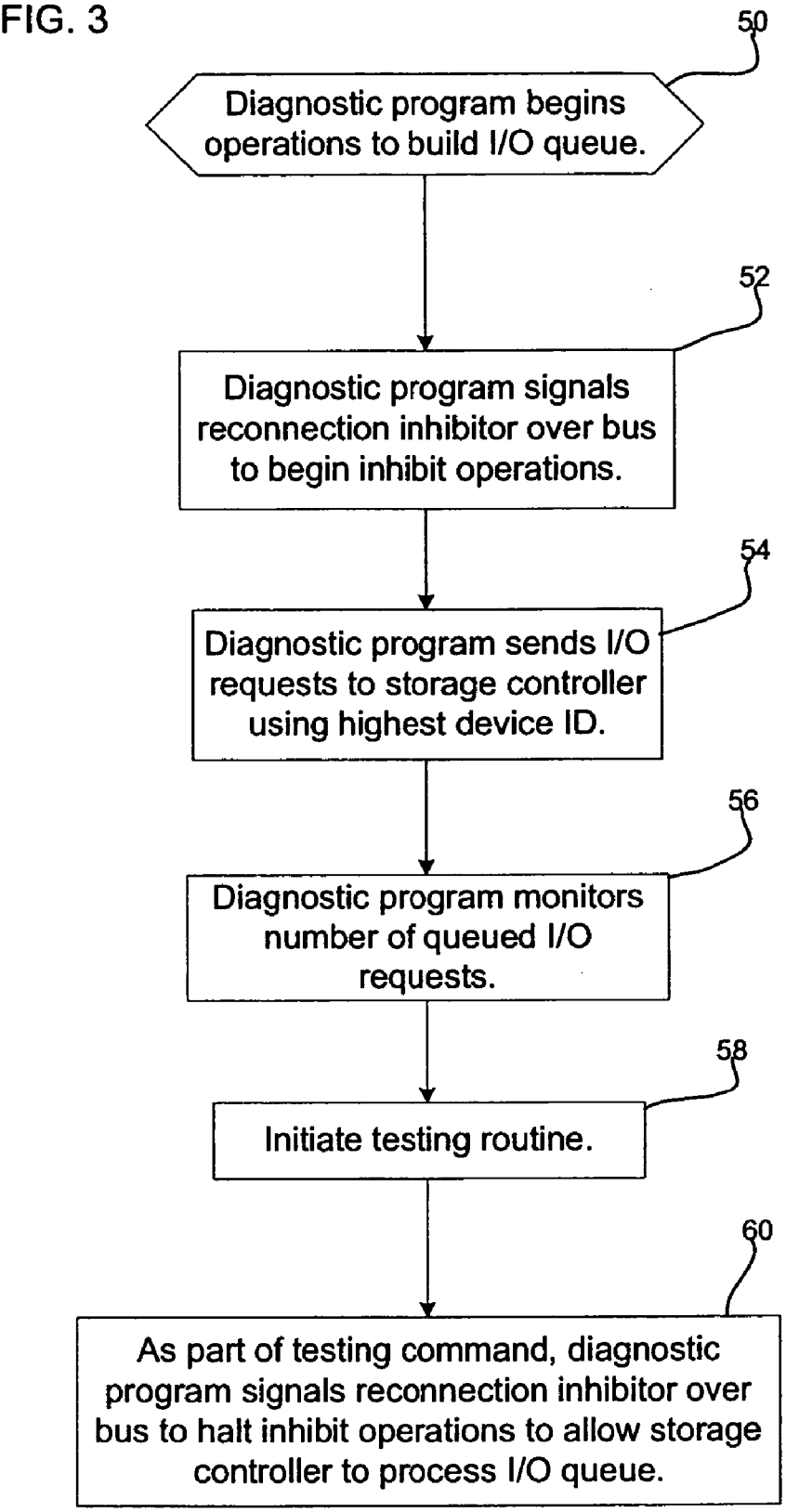
FIGS. 3, 4, and 5 illustrate operations to build a queue and test an I/O device in accordance with embodiments.

FIG. 3 illustrates operations performed by the diagnostic program 40 executing in the test initiator 38 to build an I/O queue 30 in order to perform diagnostic and testing operations with respect to the storage controller 24. Upon initiating the queue testing operations (at block 50), the diagnostic program 40 signals (at block 52) the reconnection inhibitor 36 over the bus 28 to begin inhibit operations.

Figure 4:
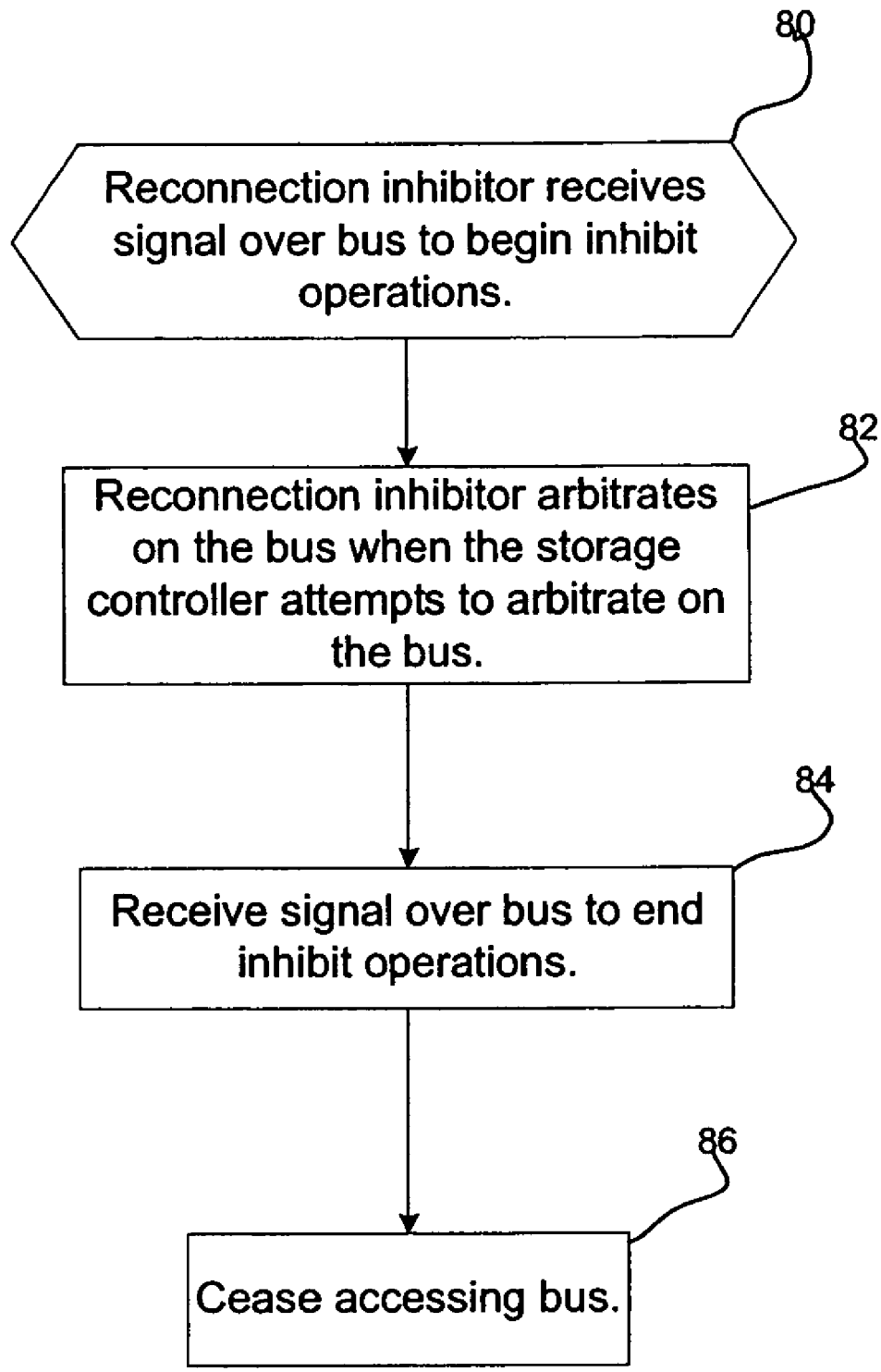

With respect to FIG. 4, the reconnection inhibitor 36 receives (at block 80) the signal from the diagnostic program 40 to begin inhibit operations. In certain embodiments, the reconnection inhibitor 36 upon power-up will check and see if the test initiator 38 has selected the reconnection inhibitor 36 over the SCSI bus 28. Upon being signaled, e.g., selected, the reconnection inhibitor 36 arbitrates (at block 82) on the bus 28 when the storage controller 24 is attempting to arbitrate on the bus. A device arbitrates on the bus by asserting the device ID and busy. Multiple devices can concurrently arbitrate on the bus. Because the reconnection inhibitor 36 is arbitrating at a higher priority, e.g., with a higher SCSI device identifier, than that used by the storage controller 24, the reconnection inhibitor 36 would gain access to the bus 28 and thus block the storage controller 24 from accessing the bus 28 in order to process and empty the I/O queue 30.

With respect to FIG. 3, while the reconnection inhibitor 36 is blocking the storage controller 24 from gaining access to the bus 28, the diagnostic program 40 may send (at block 54) I/O requests to the storage controller 24 using a highest priority, e.g., highest device ID. When the diagnostic program 40 uses the highest priority, i.e., highest device identifier to access the bus, the storage controller 24 and reconnection inhibitor 36 ports 14a, 14b will relinquish the bus to the higher priority test initiator 38. The reconnection inhibitor 36 would prevent the storage controller 24 from processing all the I/O requests in the I/O queue 30 because after processing one request, the storage controller 24 would not be able to return data or status because reconnection inhibitor 36 accessing the bus 28 blocks the storage controller 24 from accessing the bus 28 to complete the currently processed I/O operation. The storage controller 24 would not be able to complete processing of the queued I/O requests to deplete the I/O queue if the controller 24 cannot access the bus 28.

The diagnostic program 40 further monitors (at block 56) the number of queued I/O requests based on the number of outstanding requests it has sent. The diagnostic program 40 may further initiate (at block 58) a test routine to perform various testing operations on the storage controller 24 once the I/O queue 30 reaches a certain threshold or is full. For instance, the diagnostic program 40 may continue to send I/O requests after the queue 30 is full to determine how the storage controller 24 handles requests when the I/O queue 30 is fill. Further, the diagnostic program 40 may fill the queue, then signal the reconnection inhibitor 36 over the bus 28 to cease accessing the bus 28 to allow the storage controller 24 to drain the queue and then again fill the queue 30 by signaling the reconnection inhibitor 36 to determine how the storage controller 24 handles I/O requests when the queue is at different levels. Yet further, the diagnostic program 40 may submit abort commands to the I/O queue to test how the storage controller 24 handles aborted commands when the I/O queue 30 is full. At block 60, as part of testing the storage controller 24, the diagnostic program 40 may signal the reconnection inhibitor 36 over the bus 28 to halt inhibit operations to allow the storage controller 24 to process the I/O queue 30 and return data or status to the test initiator 38.

With respect to FIG. 4, upon receiving (at block 84) the signal over the bus 28 to end the inhibit operations, the reconnection inhibitor 36 ceases accessing bus 10 to allow the storage controller 24 to access the bus 28 and further process the I/O queue 4.

With the described embodiments, as part of diagnosing the storage controller 24, the diagnostic program 40 would signal the reconnection inhibitor 36 to access the bus 28 to block the storage controller 24 to allow the I/O queue 30 to build and then again signal the reconnection inhibitor 36 to cease arbitrating on bus 28 to allow the storage controller 24 to process the queue. This allows the diagnostic program 40 to test how the storage controller 24 operates when the I/O queue 30 is at different levels.

Figure 5:
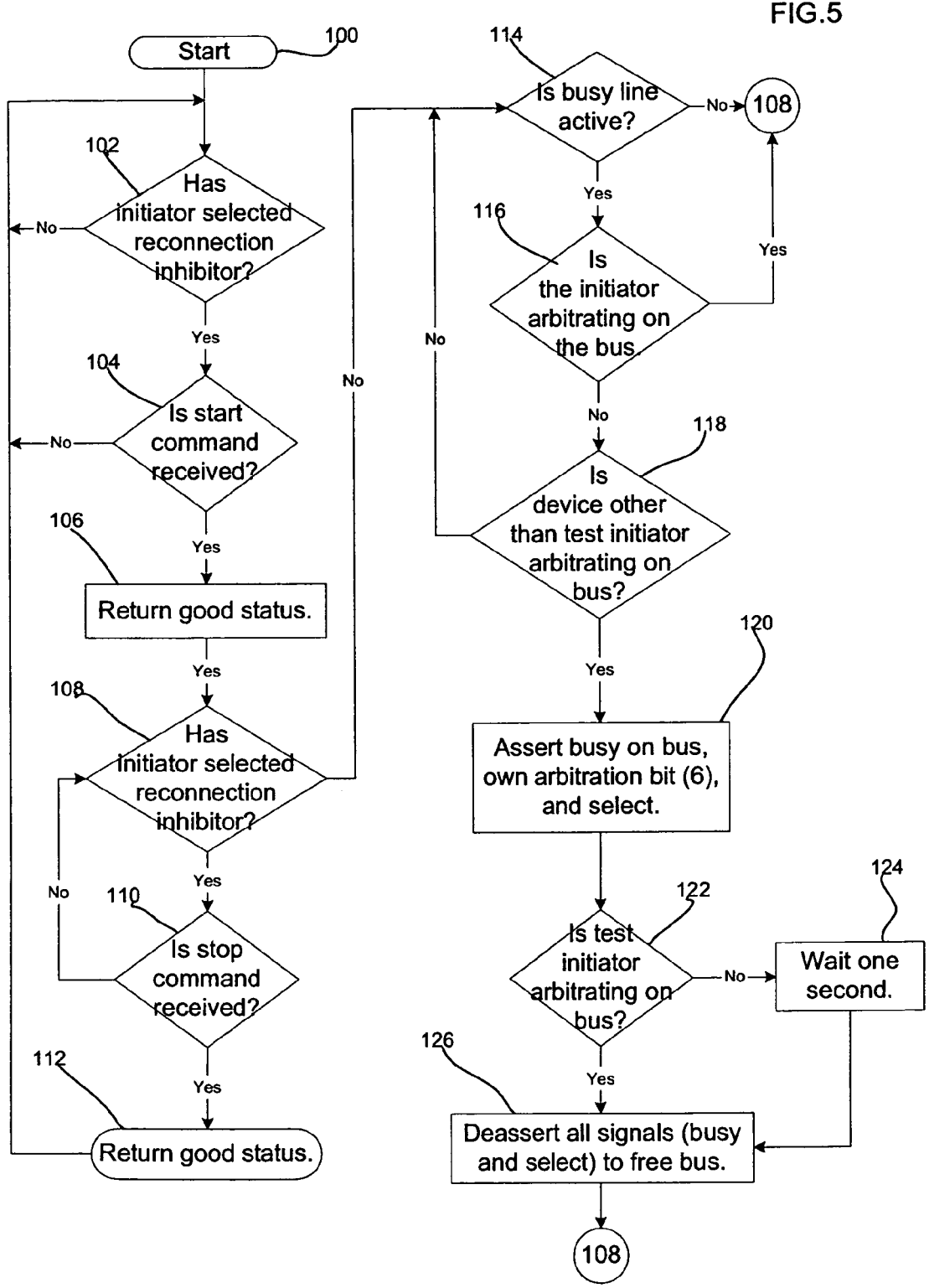

FIG. 5 illustrates a further embodiment of how the reconnection inhibitor 36 may operate to block the storage controller 24 from the bus 28 to allow the test initiator 38 to fill the I/O queue 30 with requests. The process begins at 100 upon power-up. The reconnection inhibitor 36 moves to state 102 to check and see if the test initiator 38 has selected the reconnection inhibitor 36 address on the bus 28, where the test initiator 38 may assert bus address 7 to select the reconnection inhibitor 36, which may be bus address 6. If the reconnection inhibitor 36 is not selected, then the process repeats with the reconnection inhibitor 36 continually checking to see if it is being selected.

If the reconnection inhibitor 36 is not being selected (at block 102), then the process continues to look for selection (stays in state 102). If the reconnection inhibitor 36 is being selected (from the yes branch of 102), then the reconnection inhibitor 36 responds (at block 104) to selection, and receives a command. If (at block 104) a command other than the start command is received, then the reconnection inhibitor 36 disconnects and returns to block 102 to look for selection. If (at block 104) the start command is received, then the reconnection inhibitor 36 is activated and returns (at block 106) good status to the test initiator 38 and proceeds to state 108. At block 108, the reconnection inhibitor 36 checks whether it is being selected on the bus 28 again by the test initiator 38. This check for selection is done in order to determine whether the test initiator 38 intends to deactivate the reconnection inhibitor 36. If (at block 108) the reconnection inhibitor 36 is being selected and the stop command is received (at block 110), then the reconnection inhibitor 36 deactivates as requested and returns (at block 112) good status to the test initiator 38 and proceeds to state 102 to again look for selection. If (at block 110) any other command is received, then the reconnection inhibitor 36 returns to state 108 to remain active and check for selection by the test initiator 38.

At state 108, if the reconnection inhibitor 36 is not being selected, then the reconnection inhibitor 36 will check (at block 114) whether the busy line is active, indicating that a device is arbitrating. If (at block 114) busy is not active, then the reconnection inhibitor 36 returns to state 108 to check for selection (and possible deactivation) again. If busy (at block 114) is active, then the reconnection inhibitor 36 checks (at block 116) whether bus bit 7 is active, i.e., the test initiator 38, is arbitrating. If (at block 116) the test initiator 38 is arbitrating, then the test initiator 38, having the higher priority, will win arbitration. In such case, the reconnection inhibitor 36 returns to state 108 to look again for selection and deactivation. If (at block 116) the test initiator 38 is not arbitrating, then the reconnection inhibitor 36 checks (at block 118) whether any other bits, i.e., addresses, are active on the bus 28. If (at block 118) no other bits are active, then the reconnection inhibitor 36 returns to state 214 to check whether busy is still active. This should not occur under normal operation, as some address is likely asserting busy and asserting a bit. If (at block 118) there is at least one bit other than bit 7 for the test initiator 38 active on the bus 28, such as the storage controller 24, and not the test initiator 38, then the reconnection inhibitor 36 asserts (at block 120) busy. The reconnection inhibitor 36 further asserts (at block 120) its own arbitration bit (SCSI address 6) and asserts the SELECT line, signaling the end of arbitration to all devices. The reconnection inhibitor 36 then determines (at block 122) whether the test initiator 38 has arbitrated since state 116, i.e., the last time the reconnection inhibitor 36 checked. If (at block 122) the test initiator 38 is arbitrating, then the test initiator 38 has won arbitration, and the reconnection inhibitor 36 deasserts (at block 126) its arbitration bit 6, the select line, and the busy line, and then proceeds to state 108 to check for deactivation. From block 126, control proceeds back to state 108. If (at block 122) the test initiator 38 is not arbitrating, then the reconnection inhibitor 36 holds (at block 124) all signals for one second, or some other time period, to allow all lower priority devices to drop off the bus and allow the initiator 38 time to build commands in the I/O queue. From the yes branch of block 122 or block 124, the reconnection inhibitor 36 deasserts (at block 126) all signals, returning the bus 28 to a free state. The reconnection inhibitor 36 then returns to state 108 to again check for deactivation.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the reconnection inhibitor 36 is used block a storage controller from accessing the bus to complete queued/O requests to allow a test initiator to fill an I/O queue in order to test a storage controller 24 connected to a common bus 28. In additional embodiments, the device being tested may comprise any type of I/O controller known in the art accessing I/O requests from a queue, such as a printer controller, video controller, network adaptor, etc.

In described embodiments, only one initiator is connected to the bus. In additional embodiments, multiple initiators may be connected to the bus directly, in a daisy chain configuration, in a loop configuration, etc., to transmit requests to the storage controller.

In the described embodiments, the devices were connected over a SCSI parallel bus. In alternative embodiments, additional bus interfaces known in the art may be used to enable communication among the test initiator, reconnection inhibitor and storage controller. In such alternative interface embodiments, the reconnection inhibitor may take actions to preclude the storage controller from accessing the interface to complete I/O requests.

The illustrated logic of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 6:
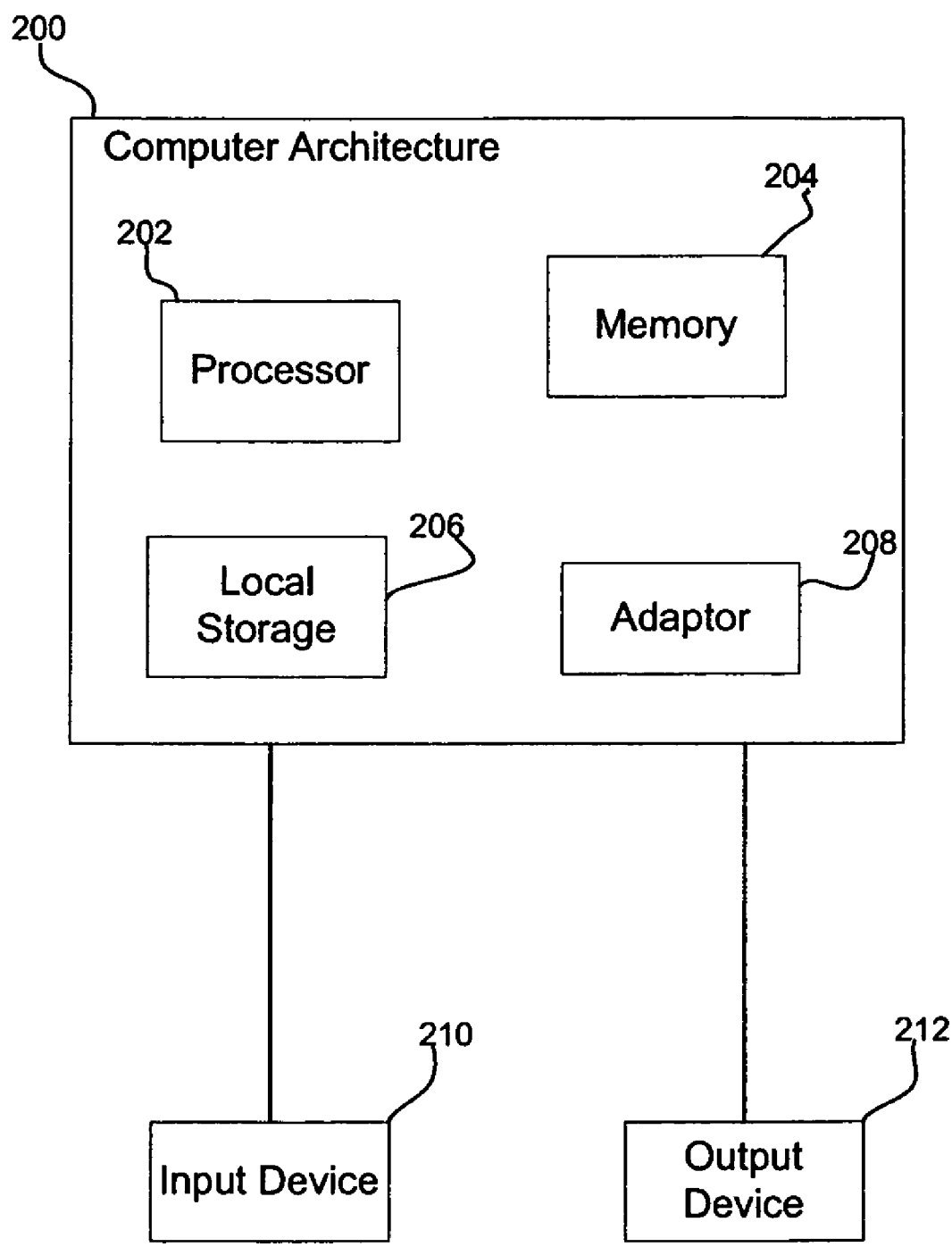
FIG. 6 illustrates a computing architecture that may be used with the components in the computing environment of FIG. 2.

FIG. 6 illustrates one implementation of a computer architecture 200 of the test initiator 38. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes one or more adaptors 208 to enable a point-to-point connection with the bus 28. As discussed, certain of the devices may have multiple adaptors. The input device 210 may be used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The reconnection inhibitor 36 may be implemented as a hardware device including hardware logic to perform the operations described with respect to FIG. 4. Alternatively, the reconnection inhibitor 36 may include a computer architecture, including features discussed with respect to FIG. 5 and an inhibitor program executed by a processor to perform the inhibit operations described with respect to FIG. 4.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    signaling, as part of a diagnostic operation with respect to an Input/Output (I/O) controller, a reconnection inhibitor over a bus to cause the reconnection inhibitor to perform an operation to access the bus to inhibit the I/O controller from accessing the bus;
    transmitting, as part of the diagnostic operation, by an initiator, I/O requests on the bus to the I/O controller, wherein the I/O requests are queued in an I/O queue, wherein the I/O controller is inhibited by the reconnection inhibitor from draining the queue while the initiator transmits requests to the I/O controller;
    signaling the reconnection inhibitor to perform an operation to cease accessing the bus, wherein the I/O controller accesses the bus to complete processing of an I/O request and process further I/O requests in the I/O queue in response to the reconnection inhibitor ceasing to issue requests on the bus; and
    performing diagnostic testing of the I/O controller when the I/O queue is at different levels, wherein the level of I/O requests pending in the I/O queue is controlled by the signaling of the reconnection inhibitor, wherein the I/O queue is increased by signaling the reconnection inhibitor to access the bus to inhibit the I/O controller from accessing the bus and depleting the I/O queue, and wherein the I/O queue is decreased by signaling the reconnection inhibitor to cease accessing the bus to allow the I/O controller to access the bus and deplete the I/O queue.

2. The method of claim 1, wherein the initiator accesses the bus at a higher priority than the reconnection inhibitor, and wherein the reconnection inhibitor accesses the bus at a higher priority than the I/O controller.

3. The method of claim 2, wherein the initiator uses a first device identifier to communicate with the bus, the reconnection inhibitor uses a second device identifier to communicate with the bus, and the I/O controller uses a third device identifier to communicate with the bus, wherein the first device identifier has priority over the second device identifier, and wherein the second device identifier has priority over the third device identifier.

4. The method of claim 1, wherein the initiator signals the reconnection inhibitor to arbitrate on the bus when a device other than the initiator is arbitrating on the bus.

5. The method of claim 1, wherein the reconnection inhibitor accesses the bus to inhibit the I/O controller when the I/O controller attempts to arbitrate on the bus.

6. The method of claim 1, wherein the reconnection inhibitor inhibits the I/O controller from processing further I/O requests in the I/O queue by preventing the I/O controller from communicating with the initiator over the bus to complete I/O requests.

7. The method of claim 1, wherein the I/O controller comprises a storage controller, and wherein the I/O requests comprise read and write requests directed to a storage system managed by the I/O controller.

8. The method of claim 1, wherein the bus comprises a SCSI parallel bus.

9. A system, comprising:
    a reconnection inhibitor;
    an initiator;
    an Input/Output (I/O) controller;
    a bus, wherein the reconnection inhibitor, initiator, and the I/O controller communicate over the bus;
    circuitry in the initiator capable of causing operations comprising:
        signaling, as part of a diagnostic operation with respect to the I/O controller, the reconnection inhibitor over the bus; and
        transmitting, as part of the diagnostic operation, I/O requests on the bus to the I/O controller after signaling the reconnection inhibitor;
        signaling the reconnection inhibitor to perform an operation to cease accessing the bus, wherein the I/O controller accesses the bus to complete processing of an I/O request and process further I/O requests in the I/O queue in response to the reconnection inhibitor ceasing to issue requests on the bus; and
        performing diagnostic testing of the I/O controller when the I/O queue is at different levels, wherein the level of I/O requests pending in the I/O queue is controlled by the signaling of the reconnection inhibitor, wherein the I/O queue is increased by signaling the reconnection inhibitor to access the bus to inhibit the I/O controller from accessing the bus and depleting the I/O queue, and wherein the I/O queue is decreased by signaling the reconnection inhibitor to cease accessing the bus to allow the I/O controller to access the bus and deplete the I/O queue; and circuitry in the reconnection inhibitor capable of accessing the bus to inhibit the Input/Output (I/O) controller from accessing the bus in response to receiving the signal from the initiator, wherein the I/O requests transmitted by the initiator are queued in an I/O queue, wherein the I/O controller is inhibited by the reconnection inhibitor from draining the queue while the initiator transmits requests to the I/O controller.

10. The system of claim 9, wherein the initiator accesses the bus at a higher priority than the reconnection inhibitor, and wherein the reconnection inhibitor accesses the bus at a higher priority than the I/O controller.

11. The system of claim 10, wherein the initiator uses a first device identifier to communicate with the bus, the reconnection inhibitor uses a second device identifier to communicate with the bus, and the I/O controller uses a third device identifier to communicate with the bus, wherein the first device identifier has priority over the second device identifier, and wherein the second device identifier has priority over the third device identifier.

12. The system of claim 9, wherein the initiator signals the reconnection inhibitor to arbitrate on the bus when a device other than the initiator is arbitrating on the bus.

13. The system of claim 9, wherein the reconnection inhibitor accesses the bus to inhibit the I/O controller when the I/O controller attempts to arbitrate on the bus.

14. The system of claim 9, wherein the reconnection inhibitor inhibits the I/O controller from processing further I/O requests in the I/O queue by preventing the I/O controller from communicating with the initiator over the bus to complete I/O requests.

15. The system of claim 9, wherein the I/O controller comprises a storage controller, and wherein the I/O requests comprise read and write requests directed to a storage system managed by the I/O controller.

16. The system of claim 9, wherein the bus comprises a SCSI parallel bus.

17. A device in communication with an initiator and an Input/Output (I/O) controller over a bus, wherein the device includes circuitry capable of causing operations comprising:
    receiving, as part of a diagnostic operation with respect to the I/O controller, a signal from the initiator; and
    accessing the bus to inhibit the Input/Output (I/O) controller from accessing the bus in response to the signal, wherein the initiator transmits, as part of the diagnostic operation, I/O requests on the bus to the I/O controller, wherein the I/O requests are queued in an I/O queue, wherein the I/O controller is inhibited by the device from draining the queue while the initiator transmits requests to the I/O controller, wherein the initiator performs diagnostic testing, of the I/O controller when the I/O queue is at different levels, and wherein the level of I/O requests pending in the I/O queue is controlled by the device inhibiting the I/O controller from accessing the bus;
    receiving a second signal from the initiator to cease accessing the bus, wherein the I/O controller accesses the bus to complete processing of an I/O request and process further I/O requests in the I/O queue in response to the device ceasing to access the bus, wherein the level of I/O requests pending in the I/O queue is controlled by the device accessing the bus, wherein the I/O queue is increased by the device accessing the bus to inhibit the I/O controller from accessing the bus and depleting the I/O queue, and wherein the I/O queue is decreased by the device ceasing to access the bus to allow the I/O controller to access the bus to deplete the I/O queue.

18. The device of claim 17, wherein the initiator accesses the bus at a higher priority than the device, and wherein the device accesses the bus at a higher priority than the I/O controller.

19. The device of claim 18, wherein the initiator uses a first device identifier to communicate with the bus, the device uses a second device identifier to communicate with the bus, and the I/O controller uses a third device identifier to communicate with the bus, wherein the first device identifier has priority over the second device identifier, and wherein the second device identifier has priority over the third device identifier.

20. The device of claim 17, wherein the device accesses the bus by arbitrating on the bus when a device other than the initiator is arbitrating on the bus.

21. The device of claim 17, wherein the device accesses the bus to inhibit the I/O controller when the I/O controller attempts to arbitrate on the bus.

22. The device of claim 17, wherein the device inhibits the I/O controller from processing further I/O requests in the I/O queue by preventing the I/O controller from communicating with the initiator over the bus to complete I/O requests.

23. The device of claim 17, wherein the I/O controller comprises a storage controller, and wherein the I/O requests comprise read and write requests directed to a storage system managed by the I/O controller.

* * * * *